Feb. 18, 1936.  E. B. FAIRCHILD  2,030,975
MIXTURE MEASURER
Filed June 10, 1933
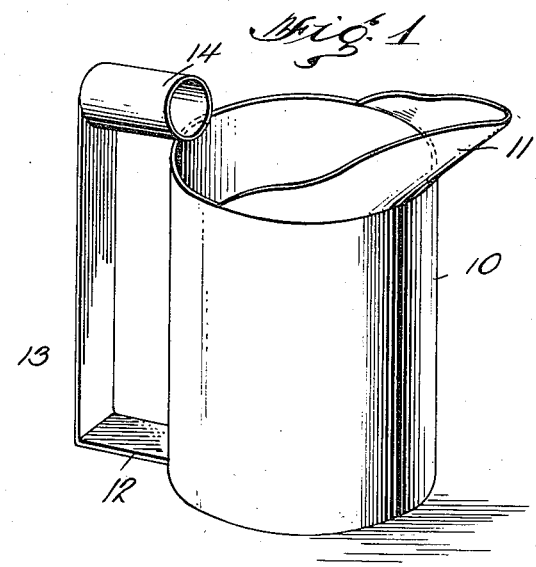
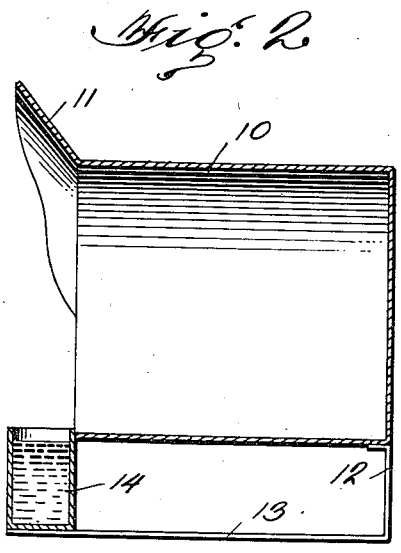 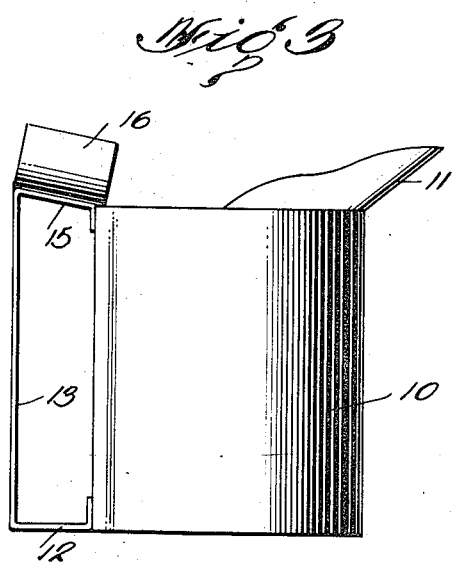
Inventor
E. Bradley Fairchild
Attorney Patented Feb. 18, 1936

2,030,975

UNITED STATES PATENT OFFICE 2,030,975

MIXTURE MEASURER

Edwin Bradley Fairchild, New York, N. Y.

Application June 10, 1933, Serial No. 675,324

2 Claims. (Cl. 73—62)

This invention relates to measuring devices and has special reference to a mixture measuring device.

One important object of the invention is to provide a novel construction of devices of this character whereby a definite quantity of one substance may be added to a definite quantity of a second substance.

A second important object of the invention is to provide a novel mixing device including a main receptacle and an auxiliary receptacle and wherein the auxiliary receptacle is automatically emptied into the main receptacle upon the latter being positioned for filling.

A third important object of the invention is to so construct the device as to provide a handle upon which the device may be supported to place the auxiliary receptacle in filling position.

With the above and other objects in view, as will be hereinafter explained, the invention consists in general of certain novel details of construction and combinations of parts hereinafter fully described, illustrated in the accompanying drawing and specifically claimed.

In the accompanying drawing like characters of reference indicate like parts in the several views, and Figure 1 is a perspective view of one form of the invention with the main receptacle in position for filling.

Figure 2 is a vertical section of the device with the auxiliary receptacle filled.

Figure 3 is a side elevation of a second form of the invention.

In the embodiments of the invention herein shown there is provided a main container 10 of any desired capacity and shape, those illustrated being of the usual cylindrical form. This container is preferably provided with a pouring lip 11 and diametrically opposite the pouring lip the main container is provided with a handle having a bottom bar 12 projecting rearwardly from the container and also having a flat back bar 13 extending upwardly from the rear end of the bottom bar and preferably parallel to the axis of the container 10.

In the form shown in Figures 1 and 2, there is provided an auxiliary container 14 also of any desired shape and in this form the rear closed end of the auxiliary container is supported on the back bar 13 flush therewith while the forward end of the auxiliary container is open and projects slightly over the wall of the container 10. Thus, the auxiliary container 14 displaces the usual top bar of the handle and is secured in place on the rear bar 13 and the edge of the wall of the container 10 in a suitable manner, as by solder.

In the form of the invention shown in Figure 3, the handle is provided with a top bar 15 and the rear bar is of such length that this top bar 15 inclines from the rear bar downwardly to the rim of the container 10. An auxiliary container 16 is mounted on the top bar 13 and inclines downwardly upon the container 10 being positioned for filling, to the rim of the main container. The auxiliary container 16 projects slightly over the rim of the main container 10.

In using the device the main container is positioned so that it is supported on the back bar 13, as shown in Figure 2. That is, it is arranged with its axis horizontal. In this position the open end or mouth of the auxiliary container is uppermost. The auxiliary container is now filled with any desired substance, usually with a liquid. The device is now turned to position the main container on its closed bottom. That is, the main container is positioned with its axis vertical. The contents of the auxiliary container will now flow into the main container and the latter may then be filled to a desired level with the other ingredient of the mixture to be made. The result will thus be to provide a definite quantity of mixture of two ingredients containing a fixed quantity of one of the ingredients.

There has thus been provided a simple and efficient device of the kind described and for the purpose specified.

It is obvious that changes may be made in the form and construction of the invention without departing from the material principles involved. It is not, therefore, desired to confine the invention to the exact forms herein shown and described, but it is desired to include all such as properly come within the scope of the invention as claimed.

Having thus described the invention, what is claimed as new, is:—

1. In a device of the kind described, a main open topped container, a secondary container having an open top and fixed to the main container at substantially right angles thereto and with its open end projecting over the edge of the main container, and a handle on the main container beneath the auxiliary container and having a flat back bar constituting a support to hold said containers with the auxiliary container substantially vertical.

2. In a device of the kind described, a main open topped container, a secondary container having an open top and fixed to the main container at substantially right angles thereto and with its open end projecting over the edge of the main container, and a handle on the main container beneath the auxiliary container and having a flap back bar constituting a support to hold said containers with the auxiliary container substantially vertical, said auxiliary container being arranged to incline slightly in a downward direction from its closed to its open end upon the main container being arranged in upright position.

EDWIN BRADLEY FAIRCHILD.